United States Patent
Xia et al.

(10) Patent No.: US 8,543,012 B2
(45) Date of Patent: Sep. 24, 2013

(54) COMPENSATING FOR END-TO-END GROUP DELAY RIPPLES

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 276 days.

(21) Appl. No.: 12/780,283

(22) Filed: May 14, 2010

(65) Prior Publication Data
US 2011/0280570 A1  Nov. 17, 2011

(51) Int. Cl.
*H04B 10/06* (2011.01)
*H04B 10/08* (2011.01)
*H04B 10/12* (2011.01)
*H04B 10/00* (2013.01)

(52) U.S. Cl.
USPC ............. 398/208; 398/202; 398/33; 398/147; 398/149; 398/159

(58) Field of Classification Search
USPC .................................................. 398/208, 33
See application file for complete search history.

(56) References Cited

U.S. PATENT DOCUMENTS

| | | | |
|---|---|---|---|
| 5,896,306 A | 4/1999 | Aschwanden | |
| 5,930,414 A * | 7/1999 | Fishman et al. | 385/11 |
| 6,263,195 B1 | 7/2001 | Niu et al. | |
| 6,753,118 B2 * | 6/2004 | Soccolich et al. | 430/30 |
| 6,781,698 B2 * | 8/2004 | Fan et al. | 356/477 |
| 7,330,663 B2 * | 2/2008 | Giles et al. | 398/147 |
| 7,587,142 B1 * | 9/2009 | Brodsky et al. | 398/152 |
| 7,701,842 B2 * | 4/2010 | Roberts et al. | 370/210 |
| 8,000,610 B2 * | 8/2011 | Yao | 398/152 |
| 8,045,856 B2 * | 10/2011 | Shen et al. | 398/65 |
| 2002/0075477 A1 * | 6/2002 | Yu et al. | 356/73.1 |
| 2003/0081308 A1 | 5/2003 | So | |
| 2003/0223758 A1 * | 12/2003 | Giles et al. | 398/147 |
| 2008/0030839 A1 * | 2/2008 | Yao | 359/281 |
| 2008/0037925 A1 * | 2/2008 | Sasaoka et al. | 385/11 |
| 2009/0196603 A1 * | 8/2009 | Zhou et al. | 398/32 |
| 2009/0304391 A1 | 12/2009 | Harley et al. | |
| 2009/0317079 A1 * | 12/2009 | Yoshida | 398/29 |
| 2010/0221021 A1 * | 9/2010 | Onaka et al. | 398/208 |
| 2010/0303459 A1 * | 12/2010 | Yuki et al. | 398/25 |

OTHER PUBLICATIONS

Woodward et al; Characterization of Real -time PMD chromatic Dispersion Monitoring in a high PMD 46-Gb/s Transmission System;Dec. 15, 2008; IEE photonics Technology letters vol. 20 No. 24; pp. 2048-2050.*

Yu et al ; Chromatic Dispersion Monitoring technique using sideband optical filtering and clock phase-shift detection; Dec. 2002; Journal of Lightwave technology vol. 20 No. 12; pp. 2267-2271.*

(Continued)

*Primary Examiner* — Kenneth N Vanderpuye
*Assistant Examiner* — Amritbir Sandhu

(57) ABSTRACT

A device may include a group delay monitor and a signal receiver. The group delay monitor may be configured to obtain group delay data corresponding to group delay of an optical signal and provide the group delay data to a signal receiver. The signal receiver configured to obtain a time-domain digital signal corresponding to the optical signal, convert the time-domain digital signal into a frequency-domain signal, apply a digital filter constructed based on the group delay data to the frequency-domain signal to obtain an output signal, and transmit the output signal.

20 Claims, 16 Drawing Sheets

(56) References Cited

OTHER PUBLICATIONS

Woodward et al; A shared PMD and chromatic Dispersion Monitor Based on a coherent receiver; May 15, 2010; IEEE photonics Technology vol. 22 No. 10; pp. 706-708.*

Yao et al; In-Service light path PMD (polarization mode dispersion) monitoring by PMD compensation; Dec. 2010; vol. 18, No. 26/ Optics Express 27306.*

Hauske et al; Optical Performance monitoring in Digital Coherent Receivers; Aug. 15, 2009; Journal of Lightwave Technology vol. 27, No. 16; pp. 3623-3621.*

Yan et al ; Differential Group Delay Monitoring Used as Feedforward information for polarization Mode dispersion compensation; Oct. 2002; IEEE photonics Technology letters vol. 14, No. 10; pp. 1463-1465.*

Heismann et al; Automatic compensation of first order polarization mode dispersion in a 10 Gb/s transmission system; Spetember 1998; ECOC 98; pp. 529-530.*

Phelts et al; Rnage biases on the WAAS geostationary satellites; Stanford university.*

Heismann et al; Automatic compensation of first order polarization mode dispersion in a 10 Gb/s transmission system; Sep. 1998; ECOC 98; pp. 529-530.*

Yan et al; differential group delay monitoring used a feedforward information for polarization mode dispersion compensation; Oct. 2002; IEEE photonics technology letters, vol. 14, No. 10; pp. 1463-1465.*

Balemarthy et al; group delay ripple in fiber bragg gratings: Electronic Equalization; 2007; optical society of America.*

Eggleton et al; tunable fiber gratings for dispersion management in high-bit rate systems; Oct. 2000; journal of lightwave technology, vol. 18, No. 10; pp. 1418-1432.*

Hauske et al; optical performance monitoring in digital coherent receivers; Aug. 15, 2009; Journal of lightwave technology, vol. 27, No. 16; pp. 3623-3631.*

Yao et al; In-service light path PMD monitoring by PMD compensation; Dec. 2010; optics express.*

Woodward et al; A shared PMD and chromatic dispersion monitor based on a coherent receiver; May 2010; IEEE photonics technology letters, vol. 200, No. 10; pp. 706-708.*

Ooi et al; automatic polarization-mode dispersion compensation in 40-Gbit/s transmission.*

Eyal et al; Design of of Broad-Band PMD compensation filters; Aug. 2002; IEEE Photonics Technology letters, vol. 14, No. 8; IEEE photonics tech.*

Woodward et al; Characterization of Real-Time PMD and Chromatic disperion monitoring in a high-PMD 46-Gb/s Transmission system; Dec. 15, 2008; IEEE photonics technology letters, vol. 20, No. 24; pp. 2048-2050.*

Yu et al; Chromatic disperisosn monitoring technique using sidband opical filtering and clock phase-shift detection; Dec. 2002; Journal of lightwave technology, vol. 20, No. 12, pp. 2267-2271.*

Group delay ripple compensation; 2012; Finsar Corporation.*

* cited by examiner

COMPENSATING FOR END-TO-END GROUP DELAY RIPPLES

BACKGROUND INFORMATION

Communication signals may degrade as they travel through different media. For example, an optical signal may suffer from chromatic dispersion (i.e., wavelength dependent dispersion of light) as the signal propagates through an optical fiber. The chromatic dispersion may produce different group delays for optical signals at different channels. Group delay is a change in phase of the signal as a function of change in frequency.

Typically, a dispersion compensation module is used to correct for the group delay variation in signals at different channels. At high data rates (e.g., 40 Gigabytes (GB)/second (s), 100 GB/s, etc.), however, the dispersion compensator module may be unable to meet the demands to compensate for the dispersion and the group delay variation.

DETAILED DESCRIPTION OF PREFERRED EMBODIMENTS

The following detailed description refers to the accompanying drawings. The same reference numbers in different drawings may identify the same or similar elements. As used herein, the term "group delay ripples" may refer to, in group delay associated with a communication medium (e.g., optical media), a feature that is reflected in a ripple-like pattern when the group delay is plotted versus frequency.

As described below, an optical receiver may compensate for group delay ripples in received signals. Typically, different factors render compensating for group delay ripples difficult. For example, group delay ripples tend to be random, and therefore, difficult to estimate for a given system. In another example, as optical signals travel through a fiber, the signals may suffer from chromatic dispersion. The chromatic dispersion may lead to different group delays for the optical signals at different channels. In such cases, signals at each of the channels may need to be compensated for different group delay ripples.

Figure 1A:
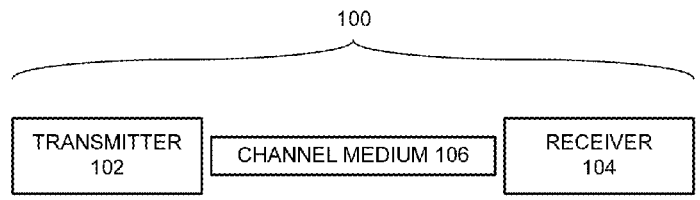
FIG. 1A is a diagram of an exemplary communication system.

FIGS. 1A through 1D illustrate the effects of compensating for group delay that is associated with an optical fiber. FIG. 1A is a functional block diagram of an exemplary communication system 100. As shown, communication system 100 may include a transmitter 102, receiver 104, and communication medium 106 (e.g., an optical fiber). Transmitter 102 may send signals over communication medium 106 to receiver 104. Receiver 104 may receive the transmitted signals from transmitter 102. Communication medium 106 may convey the transmitted signals from transmitter 102 to receiver 104.

Figure 1B:
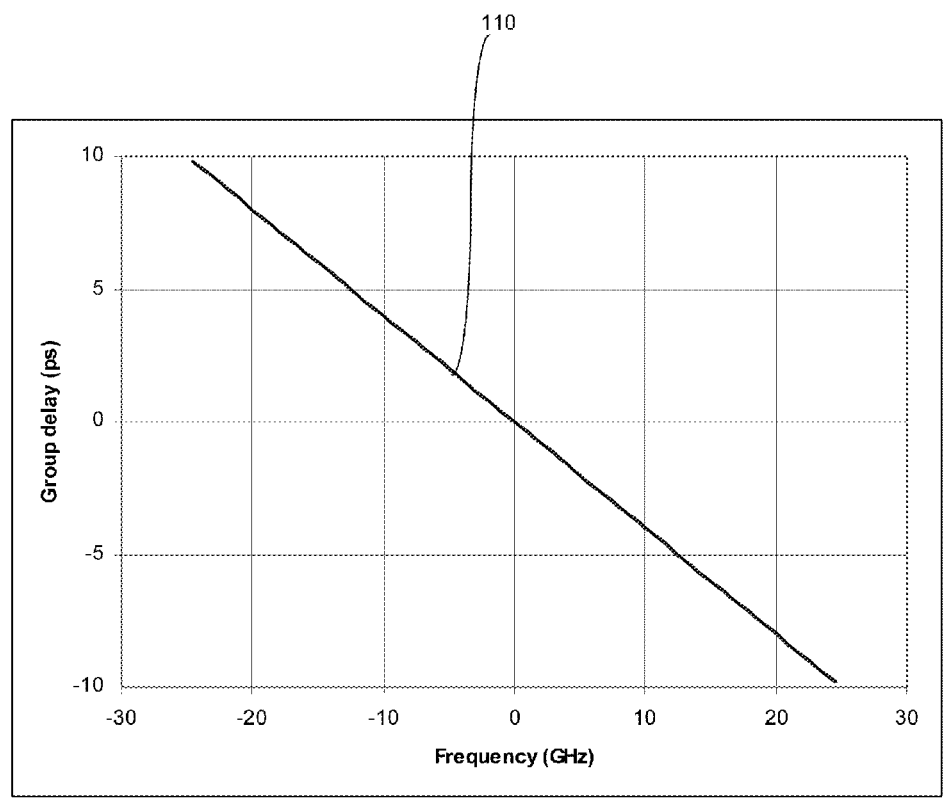
FIG. 1B is an exemplary graph of group delay of the communication system of FIG. 1.

FIG. 1B is an exemplary graph of group delay associated with communication system 100. As illustrated by plot 100, a communication signal that travels from transmitter 102 to receiver 104 through communication medium 106 may incur different group delays at different frequencies. As further shown, the group delay for communication system 100 is a linear function of frequency.

Figure 1C:
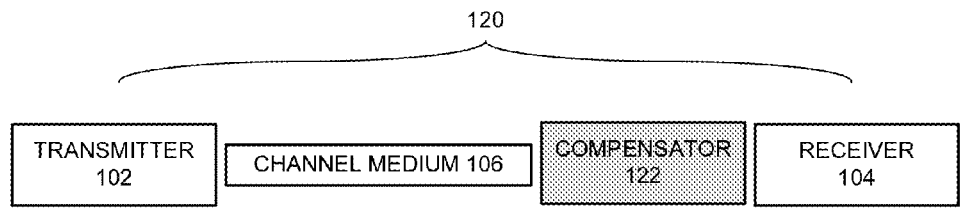
FIG. 1C is a diagram of another exemplary communication system.

FIG. 1C is a functional block diagram of another communication system 120. As shown, in contrast to system 100, system 120 may include a compensator 122. Compensator 122 may add, at the downstream end of communication medium 106, delays to the signals.

Figure 1D:
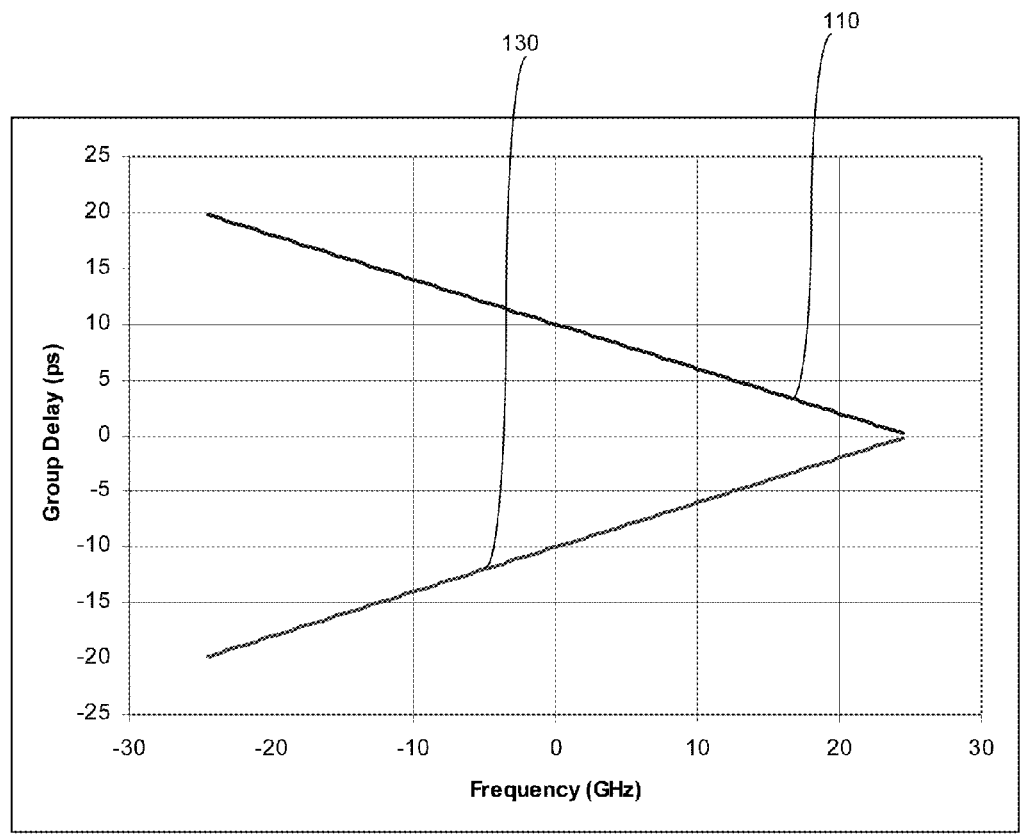
FIG. 1D is an exemplary graph of group delay of the communication system of FIG. 1C and group delay of an optical compensator.

FIG. 1D is an exemplary graph of group delay of communication system 120. As illustrated by plot 130, compensator 122 may provide delay that is a linear function of frequency, but sloped such that the sum of delays provided by communication medium 106 and compensator 122 is constant. With compensator 122 providing delay that is characterized by plot 130, receiver 104 in FIG. 1D may receive signal that is not as degraded as the signal received by receiver 104 in FIG. 1B.

In systems where group delay is more complex that that illustrated in FIG. 1D, compensator 122 may be unable to provide compensating group delay in the received signal to eliminate or reduce distortions. In signals that exhibit more complex forms of group delays (e.g., group delay ripples), an optical receiver described herein may provide compensating group delays to the signals to eliminate or reduce the distortions.

Figure 1E:
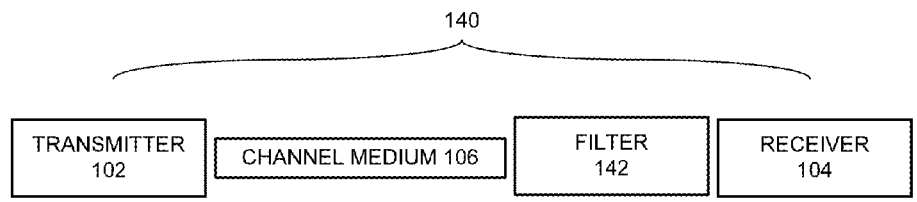
FIG. 1E is a diagram of yet another communication system.

FIGS. 1E through 1J illustrate compensating for, in the optical receiver, more complex group delays. FIG. 1E is a functional block diagram of another communication system 140. As shown, in contrast to system 100, system 140 may include a filter 142. The presence of filter 142 may modify the group delay of the signal received at receiver 104.

Figure 1F:
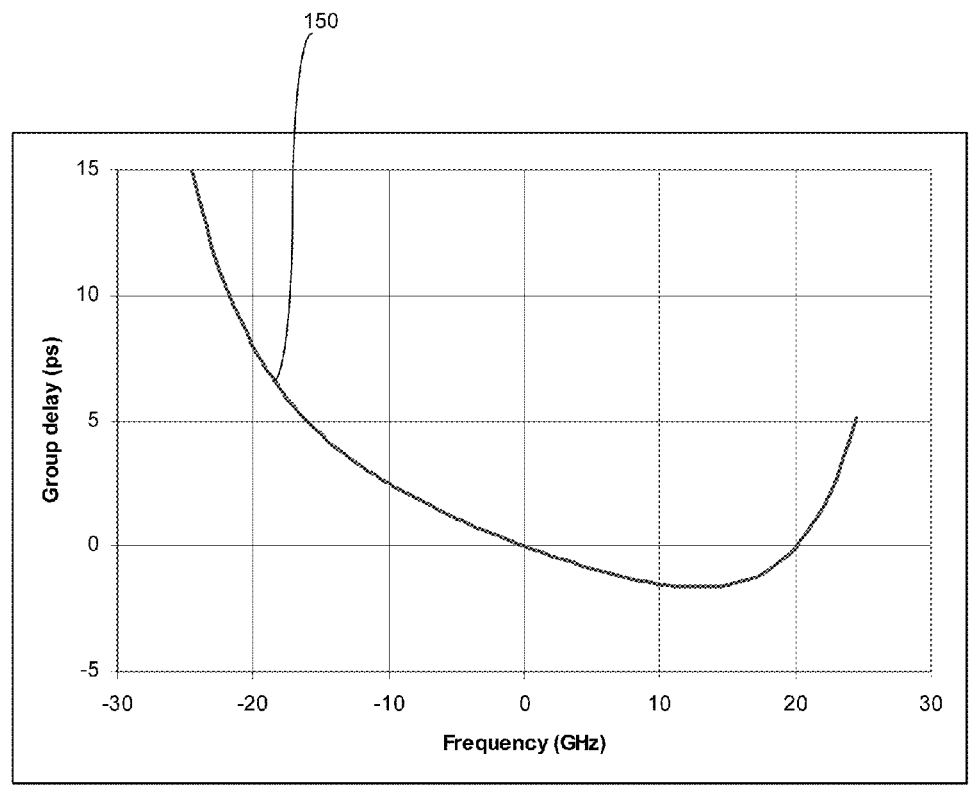
FIG. 1F is an exemplary graph of accumulated group delay associated with an optical fiber and a filter.

FIG. 1F is an exemplary graph of group delay of the received signal at receiver 104 in communication system 140. Plot 150 is the accumulated group delay of communication medium 106 and filter 142 as a function of frequency. Plot 150 is non-linear and asymmetrically U-shaped.

Figure 1G:
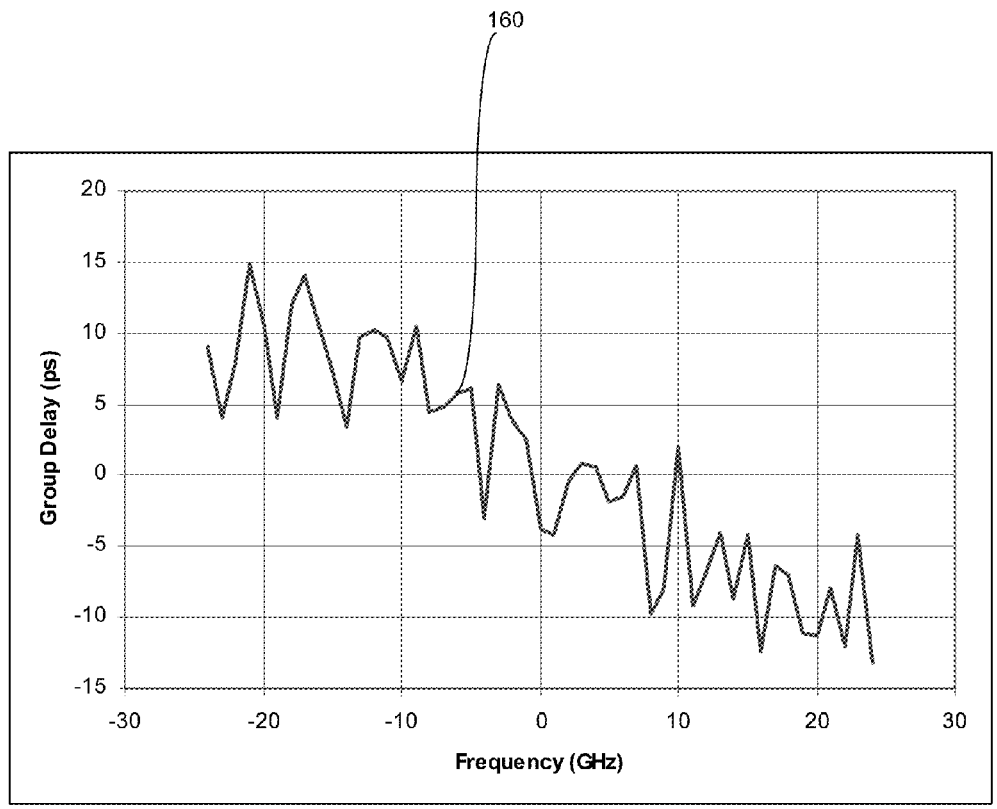
FIG. 1G is an exemplary graph of accumulated group delay associated with an optical fiber, illustrating random ripples.

FIG. 1G is an exemplary graph of accumulated group delay of communication system 100, where the group delay includes random ripples. Plot 160 shows random peaks and valleys that overlay a downward sloping plot 110 (see FIG. 1B). The ripples may be due to filter characteristics, in-line optical components (not shown in FIG. 1E), Bragg grating based compensators (not shown), etc.

Figure 1H:
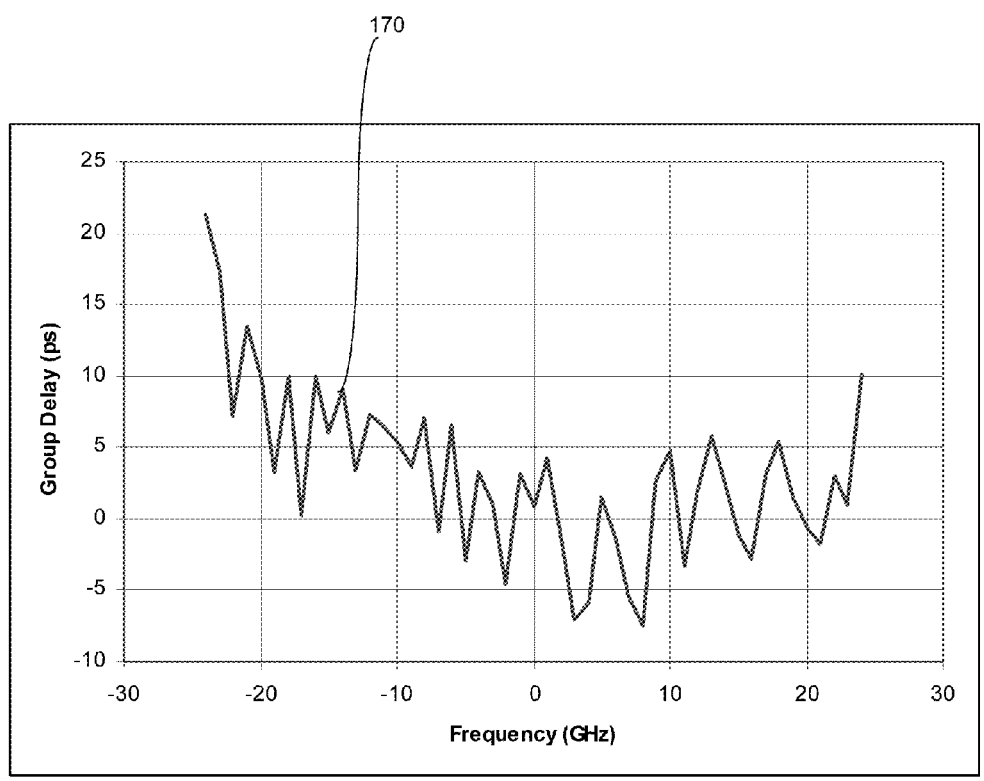
FIG. 1H is an exemplary graph of accumulated group delay associated with an optical fiber and filters, illustrating random ripples.

FIG. 1H is an exemplary graph of accumulated group delay of communication system 140, where the group delay includes random ripples. Plot 170 shows random peaks and valleys that overlay asymmetric, U-shaped plot 160 (FIG. 1F).

Figure 1J:
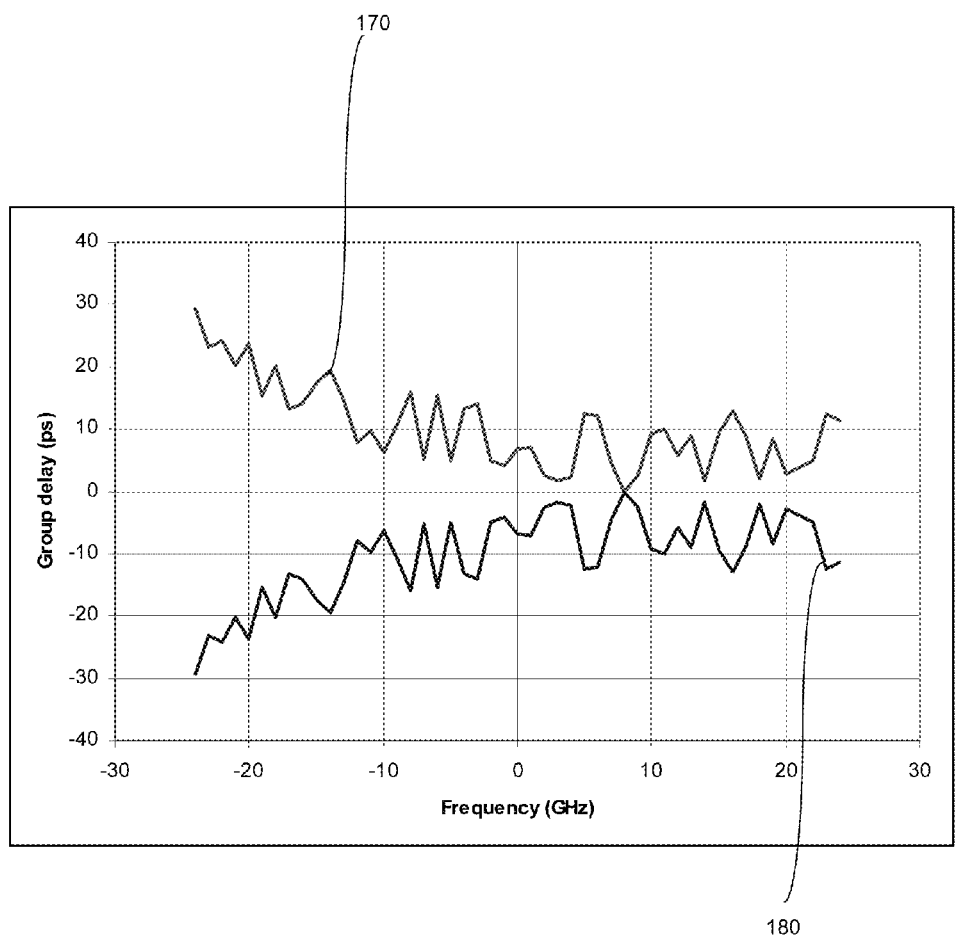
FIG. 1J is an exemplary graph of the accumulated group delay of FIG. 1H and group delay of an optical receiver.

FIG. 1J is an exemplary graph of the group delay of FIG. 1H and group delay provided by the optical receiver. As illustrated by plot 180, the optical receiver may provide group delay that is a mirror image of delay shown by plot 170. The graphical sum of plots 170 and 180 yields zero delay.

The mirror-image delay (i.e., the compensating group delay as shown by plot 180) may be obtained by measuring the group delay in the received signal. The measurement may not require separate test equipment and may be performed in-service, without impacting traffic signals (e.g., signals that carry network data).

Once the group delay has been measured, the compensating group delay may be injected into the received signal, to compensate for the measured group delay. This may eliminate or reduce signal distortions that are associated with the measured group delay. Because the group delay may be measured at any time, the optical receiver may provide up-to-date group delay compensation.

Figure 2:
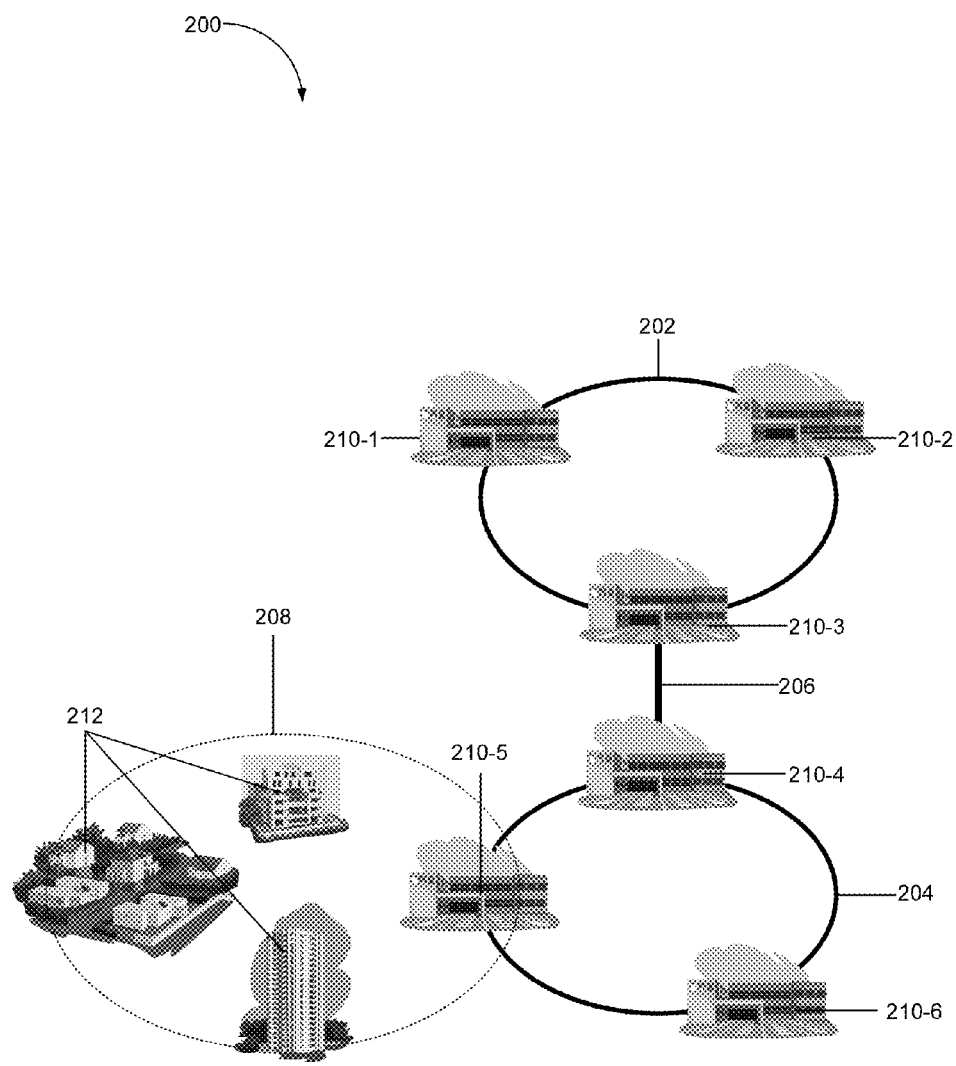
FIG. 2 is an exemplary network in which concepts described herein may be implemented.

FIG. 2 is an exemplary network in which concepts described herein may be implemented. As shown, optical network 200 (e.g., dense wave division multiplexed (DWDM) network) may include metro/regional networks 202 and 204, long haul or ultra-long haul optical lines 206, and edge network 208. Depending on the implementation, optical network 200 may include additional, fewer, or different optical networks and optical lines than those illustrated in FIG. 2. For example, in one implementation, optical network 200 may include additional edge networks and/or metro/regional networks that are interconnected by Synchronous Optical Network (SONET) rings.

Metro/regional networks 202 and 204 may include optical fibers and central office hubs that are interconnected by the optical fibers. The optical fibers may form the backbone of metro/regional optical networks 202 and 204. The central office hubs, some of which are illustrated as 210-1 through 210-6 (individually referred to as central office hub 210 and collectively as central office hubs 210), may provide telecommunication services to subscribers, such as telephone service, access to the Internet, cable television programs, etc., via optical line terminals.

Central office hub 210 may house telecommunication equipment, including switches, optical line terminals, reconfigurable add drop multiplexers (ROADMs), muxponders/transponders that are associated with the ROADMs, etc. The ROADMs may allow network traffic/channel on different wavelengths to be added or dropped from optical paths.

Long haul optical lines 206 may include optical fibers that extend from metro/regional optical networks 202 to metro/regional optical network 204.

Edge network 208 may include optical networks that provide user access to metro/regional optical network 204. As shown in FIG. 2, edge network 208 may include access points 212 (e.g., office buildings, residential area, etc.) via which end customers may obtain communication services from central office hub 210-5.

Figure 3:
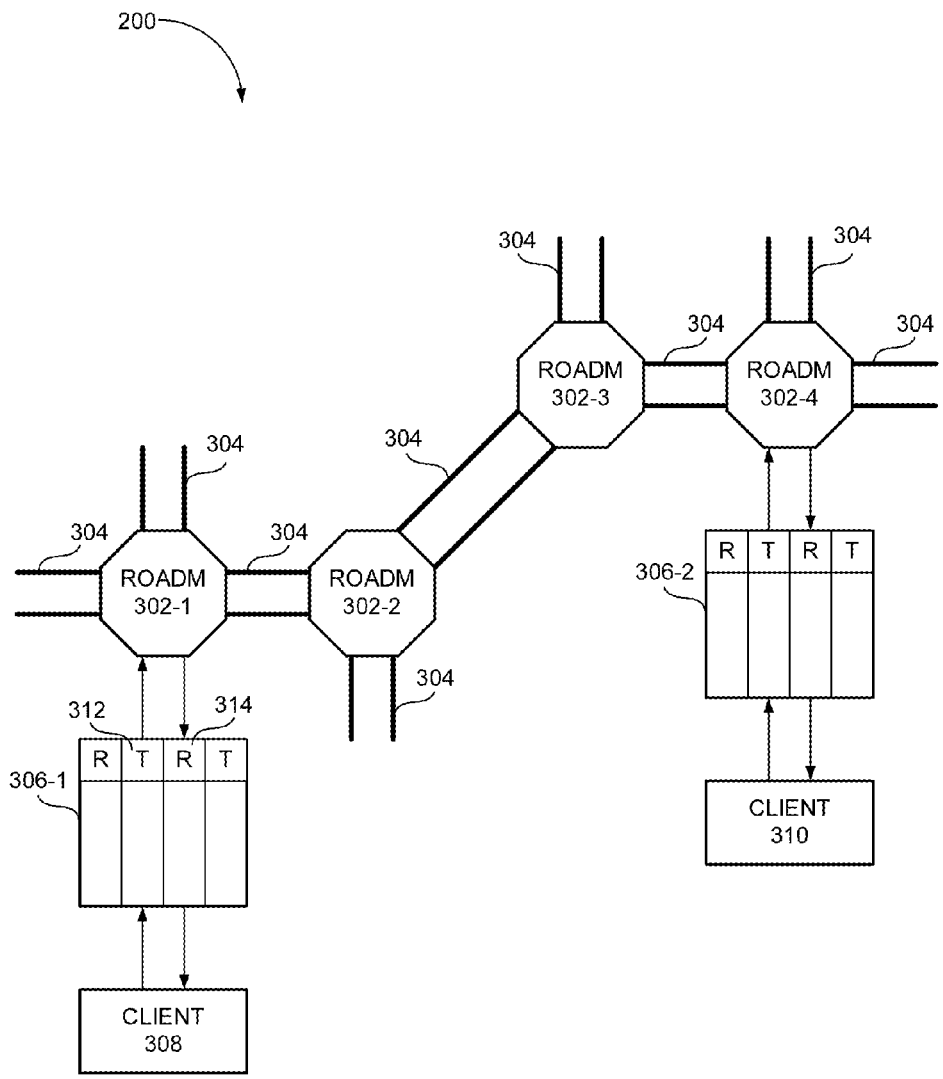
FIG. 3 is a simplified diagram of the network of FIG. 2.

FIG. 3 shows a simplified diagram of network 200. FIG. 3 illustrates network 200 as including ROADMs 302-1 through 302-4 (individually ROADM 302 and collectively ROADMs 302), optical paths 304 (e.g., trunks), muxponders/transponders 306-1 and 306-2, and client devices 308 and 310. Although network 200 may include additional, fewer, or different components than those illustrated in FIG. 3 (e.g., regenerators, optical amplifiers, additional ROADMs, etc.), they are not shown for the purposes of simplicity.

ROADM 302 may include a reconfigurable add/drop multiplexer. Controlled remotely, ROADM 302 may add or drop channels (e.g., DWDM channels) on different wavelengths to/from optical paths 304. Optical paths 304 may carry network traffic on different channels over different wavelengths.

Muxponder (e.g., multiplexing transponders) 306 may convert and convey signals to/from ROADM 302 from/to client 308 (or client 310). As further shown, muxponder 306 may include an optical transmitter 312 and optical receiver 314. Optical transmitter 312 may collect multiple client signals (e.g., signals from client 308 or 310), which are usually of lower data rate than signals on optical paths 304, and convert them into higher data rate signals over wavelengths at which optical paths 304 operate. Optical transmitter 312 may send the converted signals to ROADM 302.

Optical receiver 314 may convert signals received from optical paths 304 via ROADM 302 to signals of lower data rate, and direct the converted signals to clients (e.g., clients 308 and 310). In converting and directing the signals, optical receiver 314 may generate and inject group delay ripples into the signals. This may compensate for the group delay ripples already present in the signals, and reduce or eliminate signal distortion.

Transponder 306 may operate similarly as muxponder 306, but for a single client, and may include similar components as muxponder 306. Clients 308 and 310 may send or receive optical signals to/from ROADM 302 via muxponder/transponder 306.

Figure 4:
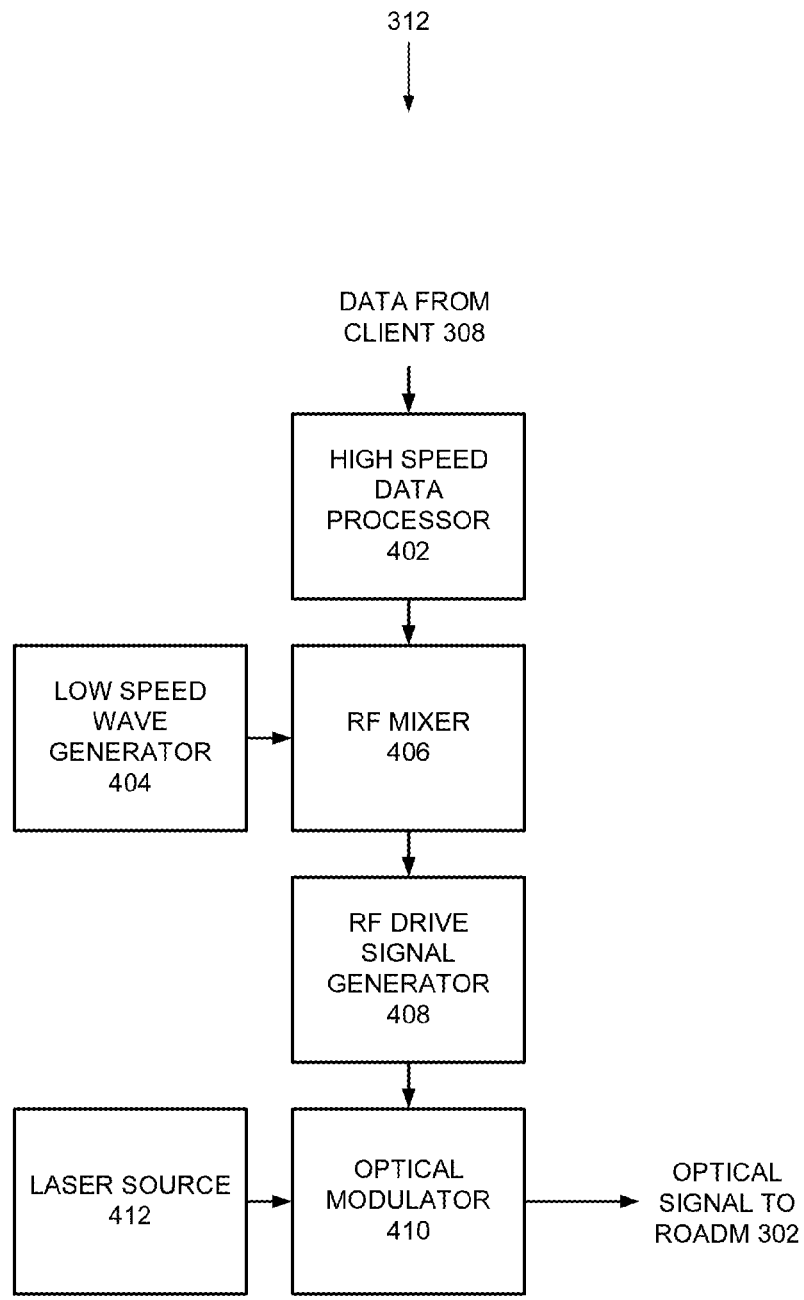
FIG. 4 is a functional block diagram of an exemplary transmitter of FIG. 3.

FIG. 4 is a functional block diagram of exemplary optical transmitter 312 according to one implementation. As shown, optical transmitter 312 may include a high speed data processor 402, low speed wave generator 404, radio frequency (RF) mixer 406, RF drive signal generator 408, optical modulator 410, and laser source 412. Depending on the implementation, optical transmitter 312 may include additional, fewer, or different components.

High speed data processor 402 may operate on incoming high speed data (e.g., 25 Gigahertz (GHz)) and prepare the data for transmission (e.g., digital to analog conversion, encoding, etc.). Low speed wave generator 404 may generate a sine/cosine wave at a low frequency (e.g., 250 Megahertz (MHz) for subcarrier modulation).

RF mixer 406 may generate an output signal by multiplying the outputs of low speed wave generator 404 and high speed data processor 402. The frequencies of the signal output by RF mixer 406 may be a linear combination of the frequencies of high speed data processor 402 and low speed wave generator 404.

Drive signal generator 408 may receive the output of RF mixer 406 and generate a modulating signal for optical modulator 410. Based on the output of drive signal generator 408, optical modulator 410 may modulate the optical carrier provided by laser source 412 and transmit the modulated signal to ROADM 302.

Figure 5:
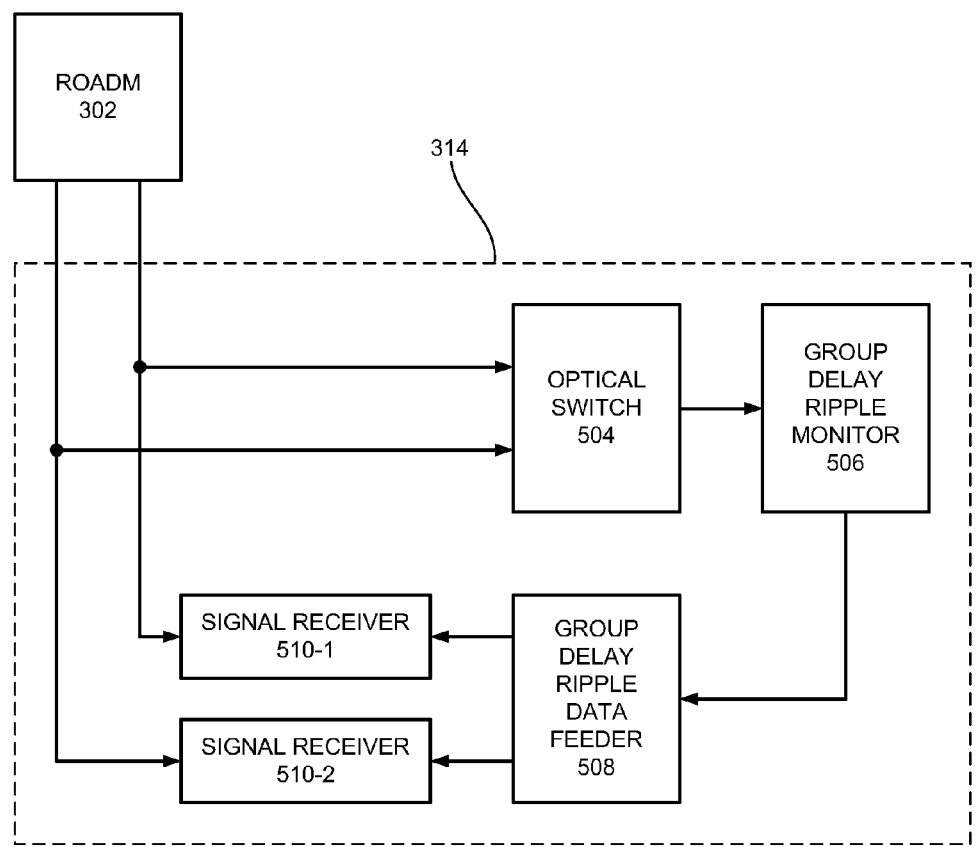
FIG. 5 is a functional block diagram of an exemplary receiver of FIG. 3.

FIG. 5 is a functional block diagram of optical receiver 314 according to one implementation. As shown, optical receiver 314 may include an optical switch 504, group delay ripple monitor 506, group delay ripple data feeder 508, and signal receivers 510-1 and 510-2 (collectively and individually signal receivers 510). Depending on the implementation, optical receiver 314 may include additional, fewer, or different components than those illustrated in FIG. 5. For example, in a different implementation, optical receiver 314 may include additional signal receivers 510 for handling additional channels from ROADM 302. In another example, optical receiver 314 may include optical amplifiers at each of the signals at optical lines from ROADM 302.

Optical switch 504 may receive tapped optical lines from ROADM 302, and, depending on its configuration, may select one of the tapped optical lines as its output. Each of the optical lines may correspond to a particular wavelength. Group delay ripple monitor 506 may measure the group delay of the wavelength/channel selected by optical switch 504. In determining the group delay, group delay ripple monitor 506 may evaluate the following, periodically based on need (e.g., an optical path changes and, therefore, the group delay associated with the optical path changes):

$$\Delta\phi/\Delta\omega, \tag{1}$$

where $\Delta\phi$ is the change in phase and $\Delta\omega$ is the change in frequency. Thus, group delay ripple monitor 506 may measure change in overall phase of the signal as a function of change in frequency.

Group delay ripple data feeder 508 may relay the group delay data obtained by group delay ripple monitor 506 to signal receivers 510. Signal receiver 510 may use the group delay ripple data from group delay ripple data feeder 508 to appropriately compensate for the group delay ripple present in the particular channel handled by the signal receiver 510. In addition, signal receiver 510 may provide the group delay ripple-compensated signal to client 310 or 308.

Figure 6:
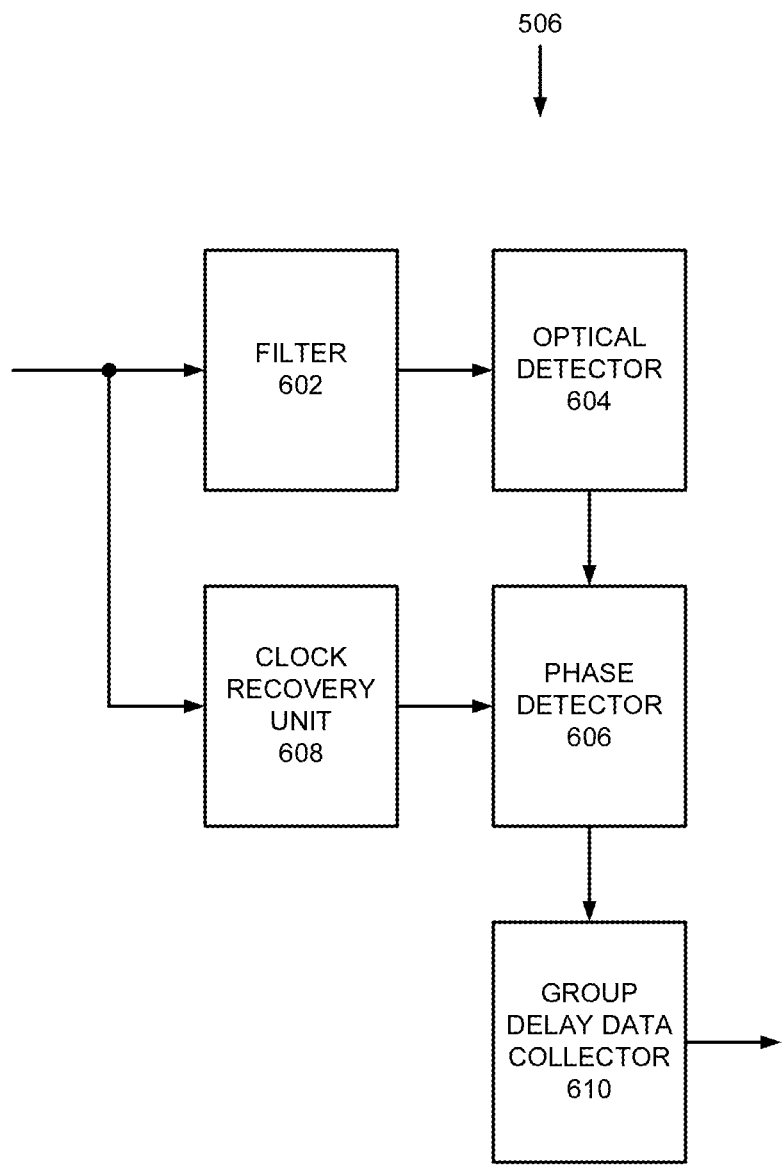
FIG. 6 is a functional block diagram of an exemplary group delay ripple monitor of FIG. 5.

FIG. 6 is a functional block diagram of group delay ripple monitor 506. As shown, group delay ripple monitor 506 may include a filter 602 (e.g., a narrow band filter), optical detector 604, phase detector 606, clock recovery unit 608, and group delay data collector 610. Depending on the implementation, group delay ripple monitor 506 may include additional, fewer, or different components than those illustrated in FIG. 6.

Filter 602 may select, from its input, a narrow range of frequencies/wavelengths (e.g., 0.01 nanometers) as its output. Optical detector 604 may detect optical signals in the output of filter 602. Phase detector 606 may compare the phase of the detected signal to the phase of a clock signal. Clock recovery unit 608 may provide the clock signal, which is recovered from the received signal, to phase detector 606. The recovered clock signal may have been synchronized to the received signal at the time of its transmission.

Group delay data collector 610 may receive samples of detected phase from phase detector 606 and use the data to determine values of the group delay at different frequencies/wavelengths. In addition, group delay data collector 610 may provide the values of the group delay (i.e., group delay ripple data) to group delay ripple data feeder 508.

Figure 7:
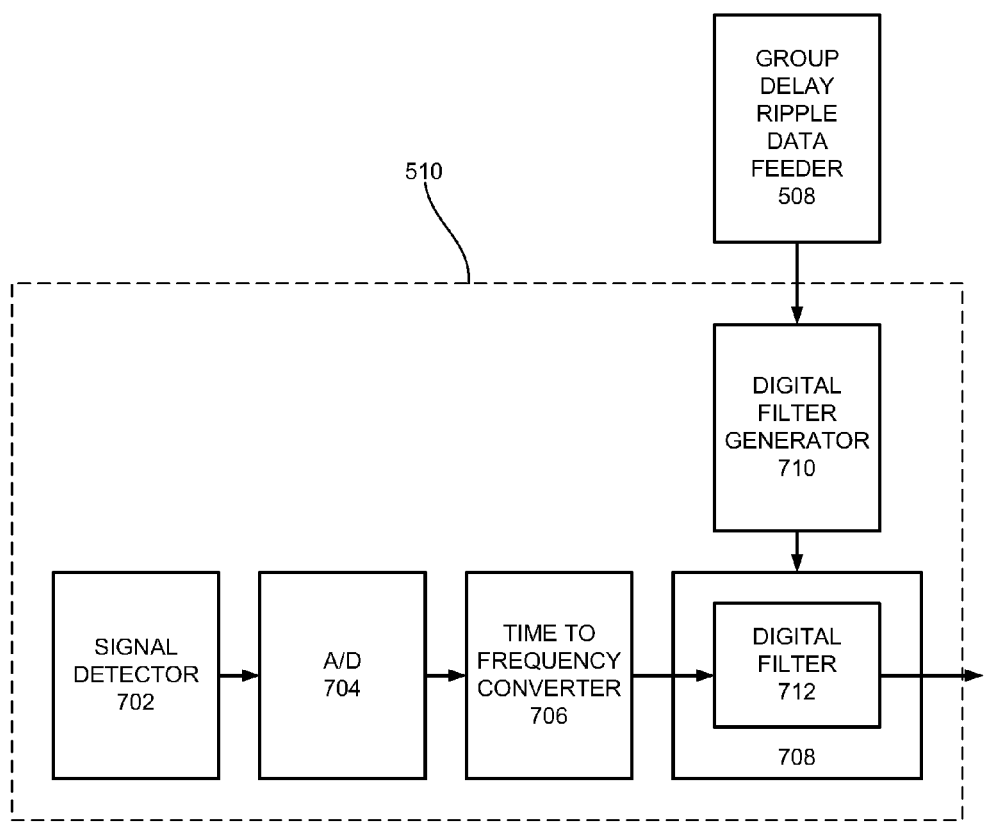
FIG. 7 is a functional block diagram of an exemplary signal receiver of FIG. 5.

FIG. 7 is a functional block diagram of signal receiver 510. As shown, signal receiver may include a signal detector 702, analog-to-digital (A/D) converter 704, time-to-frequency converter 706 (e.g., a fast Fourier transform digital signal processor), adaptable digital filter 708, and digital filter generator 710. Depending on the implementation, signal receiver 510 may include additional, fewer, or different components than those illustrated in FIG. 7.

Signal detector 702 may receive an analog signal, which may be obtained from an optical signal tapped from ROADM 302, and detect data or information in the signal (e.g., a stream of 1's and 0's). A/D converter 704 may use the output of signal detector 702 to generate a digital signal (e.g., a stream of signal samples).

Time-to-Frequency converter 706 may convert the time-domain digital signal from A/D 704 within a time window into a frequency-domain signal, by applying, for example, the fast Fourier Transform (e.g., butterfly algorithm).

Adaptable filter 708 may apply the output of time-to-frequency converter 706 to a digital filter. Adaptable filter 708 may have received the digital filter (or data for constructing the digital filter) from digital filter generator 710.

Digital filter generator 710 may receive group delay ripple data from group delay ripple data feeder 508, generate a digital filter 712 based on the data, and provide digital filter 712 to adaptable digital filter 708. In generating digital filter 712, digital filter generator 710 may set the phase and magnitude of digital filter 712 such that when adaptable digital filter 708 applies digital filter 712 to the output of time-to-frequency converter 706 (e.g., the output of time-to-frequency converter 706 is multiplied to digital filter 712 values), group delay ripples in the received signal are removed. The output of adaptable filter 708 may be transmitted to client 308/310.

Figure 8:
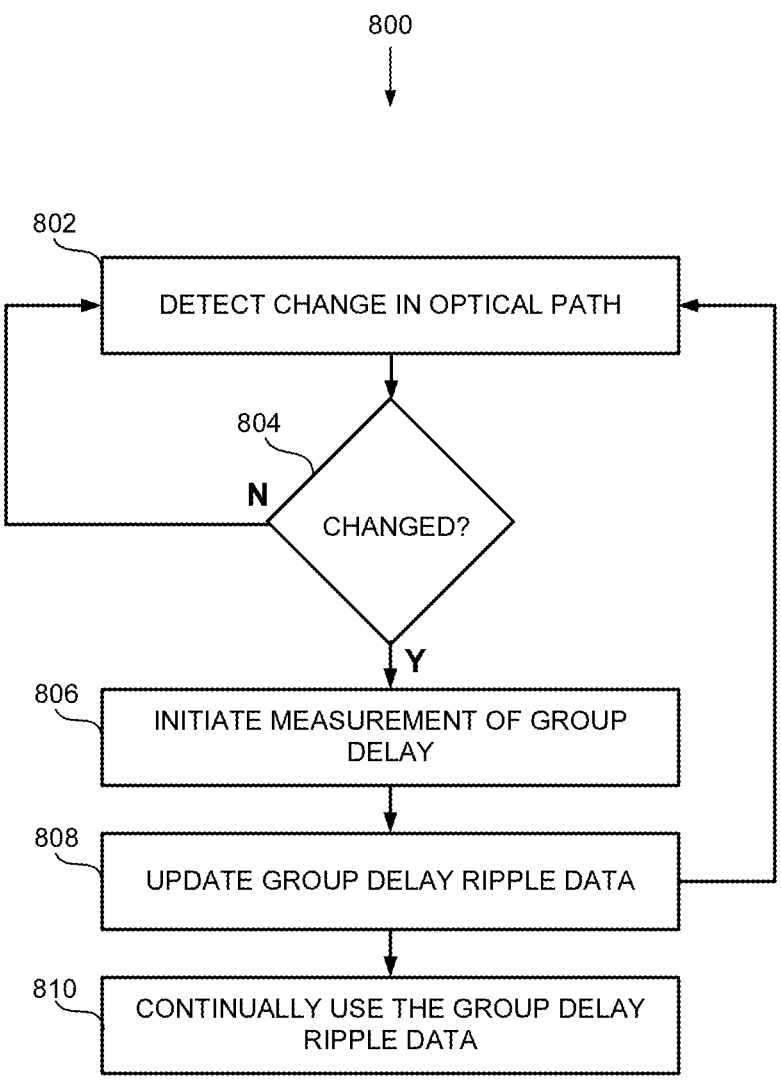
FIGS. 8 and 9 are flow diagrams of exemplary processes that are associated with compensating for group delay ripples.

FIG. 8 is a flow diagram of an exemplary process 800 that is associated with compensating for group delay ripples. Process 800 may begin with detecting a change in an optical path and/or a component in the path (block 802). Depending on the implementation, network 200 may use different ways to detect the change in the optical path. For example, optical receiver 314 within muxponder 306 may receive an alert from a network component (e.g., an optical switch 504). Alternatively, a network operator may manually notify receiver 314 of changes in network 200.

If there is no change in the optical path (block 804—NO), process 800 may return to block 802. Otherwise (block 804—YES), optical receiver 314 may begin to measure group delay (block 806). As discussed above, group delay ripple monitor 506 may measure the group delay and provide data from the measurement to signal receiver 510 via group delay ripple data feeder 508.

Optical receiver 314 may update group delay ripple data (block 808). Updating the data may entail group delay data collector 610 collecting new data from phase detector 606, and providing the data to digital filter generator 710 in signal receiver 510. Furthermore, digital filter generator 710 may generate digital filter 712 based on the data, and provide digital filter 712 to adaptable digital filter 708.

Depending on the implementation, one or more of the components of optical receiver 314 may update the group delay ripple data, in a dynamic memory and/or in persistent storage. For example, in one implementation, digital filter 512 may store the group delay ripple data, in a form that describes digital filter 712, in a dynamic memory (e.g., Random Access Memory (RAM)). In another implementation, one or more of group delay data collector 510, group delay ripple data feeder 508, or digital filter generator 710 may update the data in persistent storage.

Optical receiver 314 may continually use the group delay ripple data (block 810). For example, adaptable digital filter 708 may use digital filter 712 that is constructed based on the group delay ripple data to compensate for the group delay in the received signal.

While performing at block 810, process 800 may concurrently return to block 802, to determine whether there is a change in optical network 200. If there is a change, process 800 may update the group delay ripple data at block 808, and process 800 may use, at block 810, the updated data to compensate for the group delay.

Figure 9:
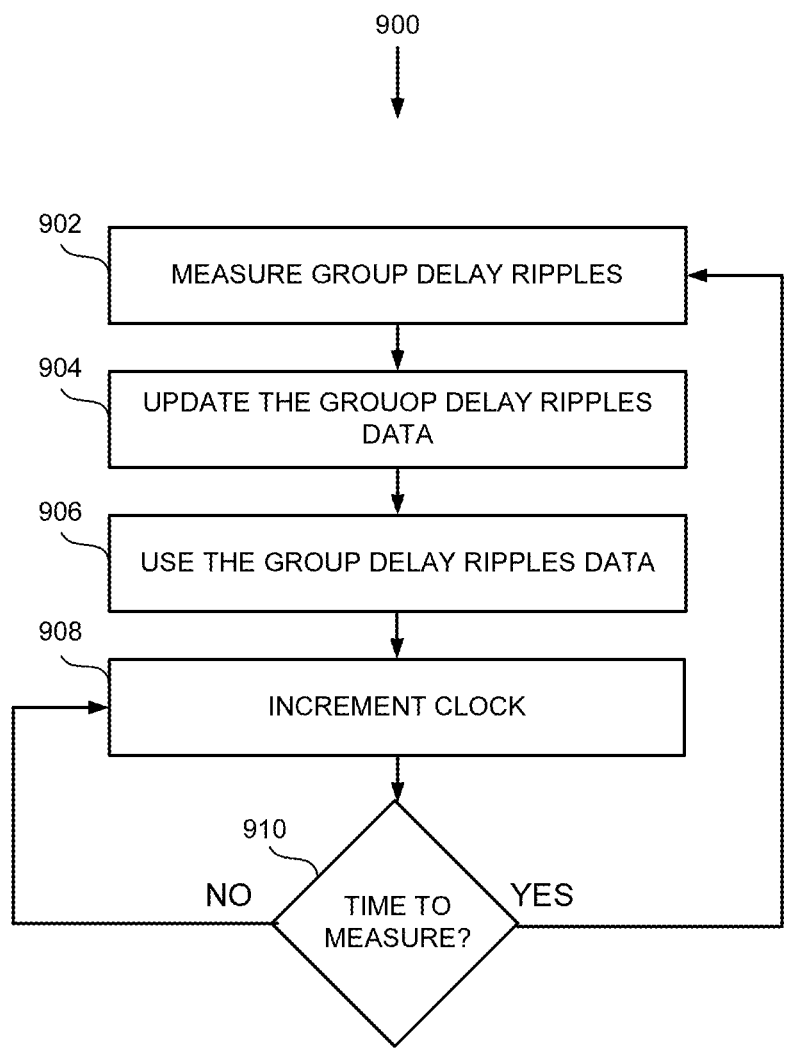

FIG. 9 is a flow diagram of another exemplary process 800 that is associated with compensating for group delay ripples. In contrast to process 800, process 900 may periodically measure group delay ripples and use the measured data to compensate for the group delay ripples in the received signal.

Process 900 may start at block 902, with measurement of group delay ripples (block 902), in a manner similar to that described above for process 800. Thereafter, optical receiver 314 may update the group delay ripples data (block 904) and use the group delay ripples data to compensate for the group delay ripples in the received signal (block 906).

In addition, while or after optical receiver 314 uses the group delay ripples data (block 906), optical receiver 314 may compare the time at clock/timer (not shown) in optical receiver 314 to a threshold (block 908). If the timer has reached the threshold (e.g., a time limit), receiver 314 may determine that the time to measure group delay ripples has arrived (block 910 —YES), and process 900 may proceed to block 902 for the next group delay ripples measurement. Otherwise, process 900 may return to block 908.

In the above description, muxponder/transponder 306 or optical receiver 314 may perform processes 800 and 900. In a different implementation, an external controller may perform or may cause optical receiver 314 to perform processes that are similar to process 800 or 900.

In these implementations, muxponder/transponder 306, optical receiver 314, and/or the external controller may include hardware components to provide functionalities of the components illustrated in FIGS. 5-7, as well as components to perform process 800 and/or 900. The hardware components may include, for example, a processing unit, a memory unit, input/output components, network interface, storage unit, communication bus, analog components, and optical components.

The processing unit may include a processor, a microprocessor, an Application Specific Integrated Circuit (ASIC), a Field Programmable Gate Array (FPGA), and/or other processing logic capable of controlling optical receiver 314 and/ or muxponder 306. In some implementations, if the microprocessor is not fast enough to provide for digital signal processing in software, the processing unit may also include specialized hardware to perform such functions (e.g., fast Fourier transform, digital filtering, etc.). The memory unit may include static memory, such as read only memory (ROM), and/or dynamic memory, such as random access memory (RAM), or onboard cache, for storing data (e.g., group delay ripple data) and machine-readable instructions (e.g., software digital signal processing modules).

The input/output components may include a display screen, a keyboard, a mouse, a speaker, a microphone, a DVD writer, a DVD reader, Universal Serial Bus (USB) lines, and/ or other types of components for converting physical events or phenomena to and/or from digital signals that pertain to muxponder/transponder 306 and/or optical receiver 314.

The network interface may enable muxponder 306 or optical receiver 314 to communicate with other devices and/or systems. For example, the network interface may communicate via a network, such as the Internet, a terrestrial wireless network (e.g., a WLAN), etc. to receive information about changes in optical paths (see block 802 in FIG. 8). Additionally or alternatively, the network interface may include a modem, an Ethernet interface to a LAN, and/or an interface/ connection for connecting muxponder 306 or optical receiver 314 to other devices.

The storage unit may include storage devices, such as a hard disk, floppy disk, CD ROM, CD read/write (R/W) disc, and/or flash memory, as well as other types of storage devices. The storage device may store programs (e.g., operating system, application, scripts, etc.) and/or data (e.g., group delay ripple data). The communication bus may provide an interface through which components of muxponder 306/optical receiver 314 can communicate with one another.

The analog components may include RF components (e.g., amplifier, mixer, etc.). The optical components may include components for DWDM (e.g., optical signal detector, optical amplifier, etc.), optical signal transmission/reception, optical filtering, multiplexing, etc.

In addition to the hardware components, muxponder/transponder 306, optical receiver, and/or the external controller may also include software components, such as an operating system to manage system resources, drivers to interface with hardware components, application programs, etc.

In the above, muxponder/transponder 306 may perform processes 800 and/or 900 to compensate for group delay ripples in received signals, by injecting a mirror-image group delay (FIG. 1J) into the received signal. The mirror-image group delay (i.e., the compensating group delay) may be obtained by measuring the group delay in the received signal. The measurement may not require separate test equipment and may be performed in-service, without impacting traffic signals.

Once the group delay has been measured, the mirror image group delay may be injected into the received signal to compensate for the measured group delay. This may eliminate or reduce signal distortions that are associated with the measured group delay ripples. Because the group delay may be measured at any time, the optical receiver may provide up-to-date compensation for the group delay.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Figure 10:
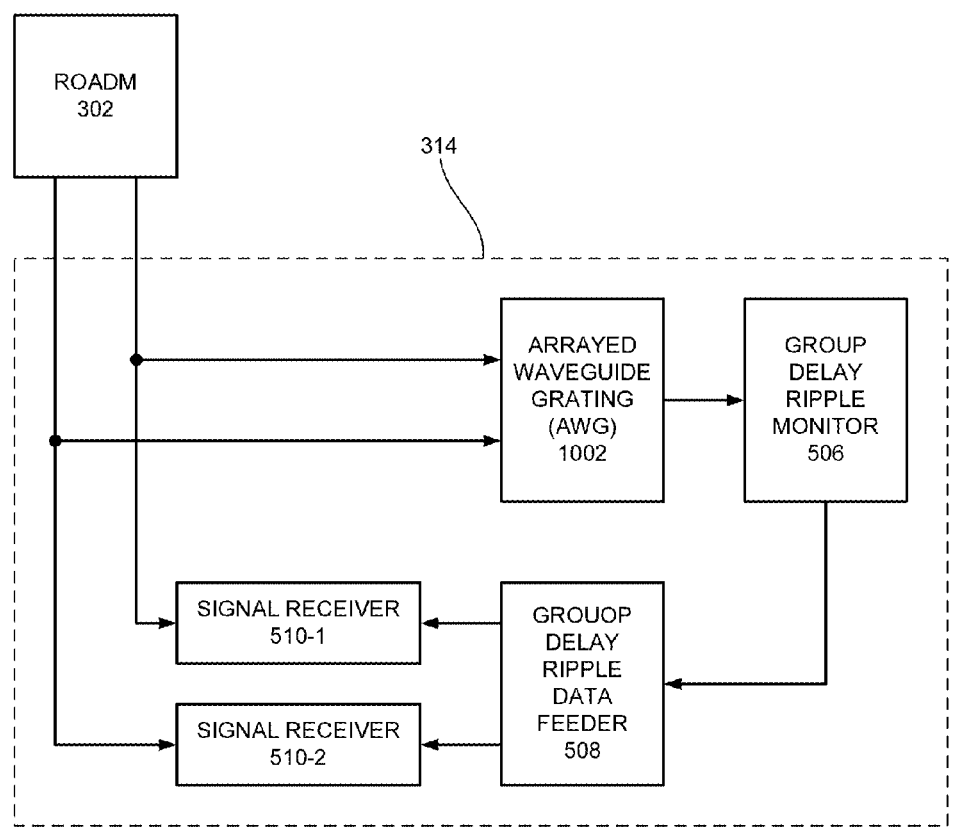
FIG. 10 is a functional block diagram of an exemplary receiver of FIG. 5 in accordance with another implementation.

For example, FIG. 10 shows optical receiver 314 according to another implementation. In FIG. 10, optical receiver 314 may include an arrayed waveguide grating (AWG) 1002 in place of optical switch 504. AWG 1002 may multiplex different wavelength channels onto a single optical fiber, and allow the components in FIG. 10 to provide for group delay ripples in the multiplexed signals.

Figure 11:
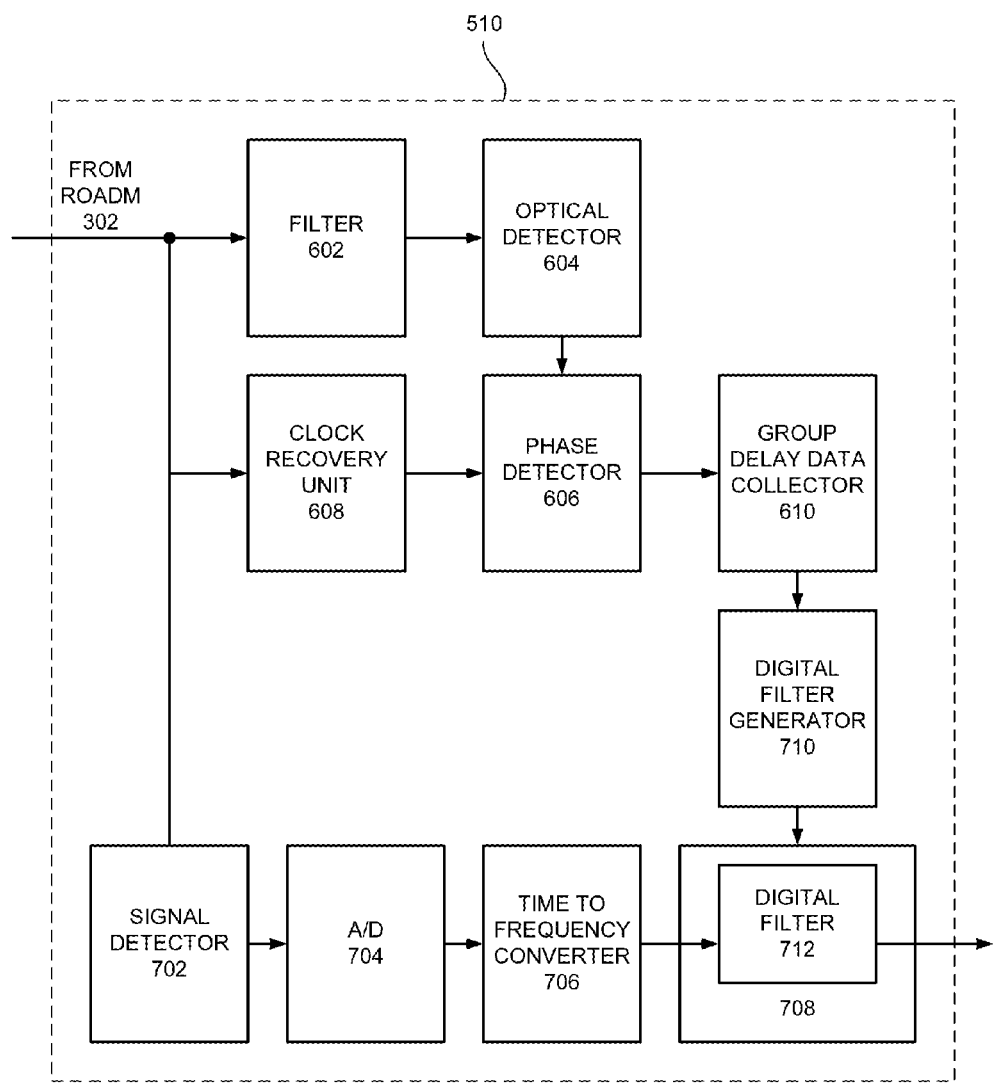
FIG. 11 is a functional block diagram of an exemplary signal receiver of FIG. 5 in accordance with another implementation.

In yet another example, FIG. 11 shows another exemplary implementation in which the components of group delay ripple monitor 506 (see FIG. 6) are integrated into signal receiver 510 that handles signal of a single wavelength from ROADM 302. In this implementation, reselecting, at muxponder/transponder 306, a different wavelength channel via optical switch 504 may avoid re-measurement of group delay ripples, and therefore, may not incur computational cost associated with monitoring group delay ripples and generating a new filter to compensate for the group delays ripples.

In still another example, optical transmitter 312 and receiver 314 are described herein as devices that relay data to/from optical channels (e.g., channels at ROADM 312) to electrical channels (e.g., channels at clients 308 and 310). In other implementations, optical transmitter 312 and receiver 314 may relay data to/from optical channels to optical channels (e.g., optical channels at clients).

In this specification, while a series of blocks have been described with regard to different processes, the order of the blocks in the processes may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, at different signal receivers of a device, an optical signal included in network traffic carried via different channels and destined for a client device;
    performing, by the device, in-service measurement of first values of original group delay ripples exhibited over select channels of the different channels of the optical signal without impacting the network traffic;
    determining, by the device, second values of compensating group delay ripples associated with each of the select channels, based on the in-service measurement of the first values;
    generating, based on the second values, the compensating group delay ripples associated with each of the select channels;
    injecting, by the different signal receivers of the device, the compensating group delay ripples into a digital signal, corresponding to the optical signal, to generate an output signal in which the original group delay ripples and the compensating group delay ripples sum to zero; and
    transmitting, from the device, the output signal from the device to the client device.

2. The method of claim 1, wherein the determining second values of compensating group delay ripples includes constructing a digital filter based on the second values of the in-service measurement of the first values, and wherein the injecting the compensating group delay ripples includes applying the constructed digital filter to the digital signal.

3. The method of claim 1, wherein the compensating group delay ripples, when plotted as a function of frequency, are a mirror image of a plot of the original group delay ripples.

4. The method of claim 1, wherein the original group delay ripples includes at least one of:
    group delay caused by the optical signal propagating through an optical fiber;
    group delay caused by optical filters on an optical path through which the optical signal has traveled; or
    group delay due to chromatic dispersion.

5. The method of claim 1, wherein the device includes one of:
    a muxponder; or
    a transponder.

6. The method of claim 1, wherein the injecting the compensating group delay ripples includes applying a fast Fourier transform to a time-domain digital signal corresponding to the optical signal.

7. The method of claim 1, wherein the in-service measurement includes:
    monitoring a timer; and
    measuring, by the device, the first values of the original group delay ripples when the device determines that the timer indicates a threshold amount of time has been reached for performing the in-service measurement.

8. The method of claim 1, wherein the in-service measurement includes:
    determining, based on information received via a network interface of the device, whether an optical path for the optical signal has changed; and
    measuring, by the device, the first values of the original group delay ripples when the device determines that the optical path has changed.

9. A device comprising:
    a group delay monitor configured to:
        obtain group delay data corresponding to group delay of an optical signal, included in network traffic destined for a client device, without impacting the network traffic;
        provide the group delay data to a signal receiver; and
    the signal receiver configured to:
        determine, based on the group delay data, that the group delay of the optical signal corresponds to accumulated group delay ripples;
        obtain a time-domain digital signal corresponding to the optical signal;
        convert the time-domain digital signal, within a time window, into a frequency-domain signal;
        apply a digital filter, constructed based on the group delay data to compensate for the accumulated group delay ripples, to the frequency-domain signal to obtain an output signal in which the accumulated group delay ripples have been removed; and
        transmit the output signal to the client device.

10. The device of claim 9, wherein the device comprises: a muxponder or transponder.

11. The device of claim 9, further comprising one of:
    an optical switch to select the optical signal among optical signals, in the network traffic, at different wavelengths; or
    an arrayed waveguide grating to combine optical signals received from a reconfigurable optical multiplexer (ROADM) into a single optical signal.

12. The device of claim 11, wherein the group delay monitor is further configured to:
    obtain group delay of a second optical signal when the optical switch selects the second optical signal among the optical signals.

13. The device of claim 11, wherein the group delay monitor is further configured to:
    obtain an update of the group delay of the optical signal when an optical path of the optical signal changes.

14. The device of claim 11, wherein the optical signals include optical signals from a reconfigurable optical multiplexer (ROADM).

15. The device of claim 9, wherein the group delay monitor includes:
- a narrow band tunable filter to filter the optical signal;
- an optical detector to extract a data signal from the filtered optical signal;
- a clock recovery unit for extracting a clock signal from one of:
  - the optical signal or
  - an analog signal corresponding to the optical signal;
- a phase detector that determines, at different frequencies, a phase differences between the clock signal and the data signal; and
- a data collector to obtain the group delay data based on the phase differences.

16. The device of claim 15, further comprising:
- an amplifier to amplify the optical signal and to provide the amplified signal to the group delay monitor.

17. The device of claim 9, wherein the signal receiver includes the group delay monitor.

18. The device of claim 9, wherein the signal receiver includes:
- a digital signal processor to convert the time-domain digital signal into the frequency domain signal; or
- a software component to convert the time-domain digital signal into the frequency domain signal.

19. A device comprising:
a plurality of signal receivers, each of the signal receivers configured to:
- obtain, without impacting network traffic destined for a client device, group delay data corresponding to group delay of optical signals, included in the network traffic, input to the signal receivers;
- determine, based on the group delay data, that the group delay corresponds to group delay ripples exhibited in the optical signal;
- configure a digital filter, based on the group delay data, to compensate for the group delay ripples;
- obtain a time-domain digital signal from the optical signal;
- convert the time-domain digital signal into a frequency domain signal;
- apply the digital filter to the frequency domain signal to obtain an output signal in which the group delay ripples have been removed; and
- transmit the output signal to the client device.

20. The device of claim 19, further comprising an optical switch to select an optical signal corresponding to one of the signal receivers.

* * * * *